Patented Jan. 20, 1931

1,789,322

UNITED STATES PATENT OFFICE

RURIC C. ROARK AND RICHARD T. COTTON, OF WASHINGTON, DISTRICT OF COLUMBIA, ASSIGNORS TO THE GOVERNMENT AND THE PEOPLE OF THE UNITED STATES OF AMERICA

MATERIAL FOR KILLING INSECTS

No Drawing.   Application filed November 23, 1927.   Serial No. 235,382.

(GRANTED UNDER THE ACT OF MARCH 3, 1883, AS AMENDED APRIL 30, 1928; 370 O. G. 757)

This application is made under the act of March 3, 1883, chapter 143 (22 Statutes, 625), and the invention herein described and claimed may be used by the Government of the United States and its officers and employees in the prosecution of work for the Government and by any other person in the United States, either in public or private work, without payment to us of any royalties thereon.

An object of the invention is to provide a non-inflammable material suitable for fumigating grain weevils in box cars and bins; clothes moths, carpet beetles, and furniture beetles in fumigating vaults; and stored product insects in general.

Another object is to provide a material for fumigating weevils in grain which will not injuriously affect the milling properties of the grain, the baking qualities of the flour made therefrom, or the value as feed-stuffs of the grain or of the bran and other by-products resulting in the manufacture of the flour.

At the present time carbon disulfide is extensively employed for destroying weevils and other injurious insects infesting wheat and other grains, but certain very serious disadvantages attend the use of this material. Its odor is offensive and the vapor in moderate concentration is quite toxic to man. While quite volatile, complaints occasionally come from millers that wheat which has been treated with carbon disulfide still carries its odor, and it has been proven that the baking quality of flour from carbon disulfide fumigated wheat is sometimes injuriously affected.

The most serious objection to the use of carbon disulfide as a fumigant, however, arises from the fact that it is readily inflammable and that its vapor when mixed with air is highly explosive. For this reason fire insurance companies refuse to carry the fire risk on elevators during such time as carbon disulfide is being used to treat the grain contained therein. Recently the General Managers Association of Chicago, representing the leading railway systems in the United States adopted a resolution prohibiting the use of carbon disulfide for fumigating cars of grain. There is, therefore, a great need of a substitute for carbon disulfide for fumigating purposes.

A great variety of substances other than carbon disulfide have been proposed and tried in the fumigation of grain weevils, but have never come into commercial use. Some of these substances are: carbon tetrachloride, hydrocyanic acid gas, sulfur dioxide, carbon dioxide, chloropicrin, naphthalene, phosgene, arsine, and cyanogen chloride. Numerous investigators have concluded that carbon tetrachloride is ineffective; hydracyanic acid gas fails to kill weevils at any great depth below the surface of the grain; sulfur dioxide has low toxicity, is very injurious to ironwork, destroys the germination power of wheat, makes a sticky dough and hinders fermentation, the bread obtained being heavy and not fit for consumption; carbon dioxide is effective only in tightly-sealed containers and at relatively high concentrations over a considerable period of time; the use of chloropicrin requires a gas mask and its low vapor pressure at ordinary temperatures necessitates a special treatment of the fumigated flour before it is suitable for baking; naphthalene is not very effective and its odor is persistent and highly objectionable; phosgene is very poisonous to man and comparatively non-poisonous to insects and its high vapor pressure makes it difficult to control; the toxicity of arsine to insects is comparatively low; and the shortcomings of cyanogen chloride as a fumigant are essentially the same as those of hydrocyanic acid gas.

It is evident, therefore, that there is great need for a fumigant which is effective in ridding wheat and other cereals of injurious insects, which is not dangerously toxic nor highly disagreeable to those handling the material, and which can be used without danger of fire or explosion.

We have found that the esters of halogenated fatty acids are effective insecticides; that they do not injure the milling and baking qualities of wheat; that they do not bleach or otherwise injure clothing and fabrics; that they do not corrode metals; and that they can be mixed with non-inflammable liquids such as carbon tetrachloride to form non-inflammable mixtures. They thus are suitable for fumigating insects in grain, clothing, carpets, upholstered furniture and other places where it is undesirable to use an inflammable fumigant or one highly poisonous to man.

We have found that esters of chloroformic, monochloroacetic, dichloroacetic, trichloroacetic, monobromoacetic, betachloropropionic, and alpha- and beta-bromopropionic acids are particularly suited for use as fumigants. While the esters of the bromo-substituted acids are more toxic than the corresponding chloro- ones, the lower price of chlorine more than offsets this difference in toxicity. We, therefore, prefer to use esters of the chloro-substituted fatty acids, and of these the esters of monochloroacetic acid are the best.

The following esters of monochloroacetic acid are particularly suited for use as fumigants: methyl, ethyl, isopropyl, normal butyl and secondary butyl. These are all liquids at ordinary temperatures, possess pleasant odors, are inexpensively prepared and can be made reasonably free from fire hazard by mixing with carbon tetrachloride.

By the term "reasonably free from fire hazard" we mean a material whose vapor heated to 122° F. in admixture with air in a box or other receptacle, and sparked with an electric spark, will not propagate a flame. A material which passes this test is considered to be free from fire hazard when used under ordinary conditions.

In place of carbon tetrachloride other chlorinated hydrocarbons may be used, such as trichloroethylene and tetrachloroethylene; or any other non-inflammable liquid such as halogen or nitre substituted compounds may be used, e. g., chloropicrin or tetranitromethane.

On account of its cheapness and ready volatility we prefer to use carbon tetrachloride to make non-inflammable mixtures with the esters of halogenated fatty acids. Preferably, from 1 to 3 volumes of carbon tetrachloride should be added to each volume of the ester to make a non-inflammable mixture, but a mixture containing anywhere from 90 to 10 per cent by volume of ester is potent as an insecticide and may be employed. The boiling points and formulas of these esters of monochloroacetic acid are as follows:

Methyl monochloroacetate $CH_2ClCOOCH_3$ ---- 131.5 °C.
Ethyl monochloroacetate $CH_2ClCOOC_2H_5$ ---- 144.2 "
Isopropyl monochloroacetate $CH_2ClCOOCH(CH_3)_2$ ---- 145 "
Normal butyl monochloroacetate $CH_2ClCOOC_4H_9$ ---- 175 "
Secondary butyl monochloroacetate $CH_2ClCOOCH(CH_3)_2CH_3$ -- 165 "

These esters are all nearly insoluble in water, but readily soluble in ether, carbon tetrachloride, and other organic solvents.

The minimum lethal dosage of these esters to rice weevils in wheat, allowing 24 hours exposure at a temperature of about 75° F., varies from about 1.5 pounds per 1,000 cubic feet of enclosed space for the methyl ester to about 6 pounds for the normal butyl ester.

The processes of applying these esters are exactly the same as those used with carbon disulfide. The mixtures may be poured, sprinkled, or sprayed over the surface of the grain it is desired to fumigate; the mixtures may be placed in shallow pans and allowed to evaporate; the mixtures, either in the form of a liquid or a vapor, may be pumped into the grain at any desired depth through a pipe provided with orifices along its length or at its extremity.

While we have described the use of these esters against weevils in wheat, their application as insecticides is not restricted to this purpose. These esters may be used in the form of a spray to kill flies, mosquitoes and other household insects; or as a fumigant to kill any insect in an enclosed space, such as insects on trees or other vegetation temporarily confined under a fumigating test; insects in clothing, carpets, furs, upholstered furniture, etc., in a fumigating vault; insects in drawers, closets, trunks, boxes, or rooms that can be tightly closed; insects in mills, warehouses, ships, etc., and other places where the vapors of the fumigant can be confined for a definite period of time.

Having thus described our invention, we claim:

1. As a new composition of matter a mixture of an ester of a halogenated fatty acid and a non-inflammable liquid, miscible therewith, in such proportion as to be non-inflammable at ordinary temperatures.

2. As a new composition of matter a mixture of an ester of monochloroacetic acid and a non-inflammable liquid, miscible therewith, in such proportion that the vapor of the mixture, when heated to 122° F. in admixture with air, will not propagate a flame.

3. As a new composition of matter a mixture of 1 to 9 volumes of an ester of monochloroacetic acid and 9 to 1 volumes of carbon terachloride.

4. An insecticide containing as its essential active ingredient an ester of a halogenated fatty acid.

5. An insecticide containing as its essential active ingredient an ester of monochloroacetic acid.

6. An insecticide, fungicide and disinfectant comprising saturated aliphatic compounds containing the monochloroacetyl group.

7. An insecticide, fungicide and disinfectant comprising saturated aliphatic esters containing the monochloroacetyl group.

8. An insecticidal fumigant containing as its essential active ingredient an ester of monochloroacetic acid.

9. As an insecticidal fumigant an ester of monochloroacetic acid.

RURIC C. ROARK.
RICHARD T. COTTON.